May 27, 1947.　　　　F. M. YOUNG　　　　2,421,362
HEAT EXCHANGER
Filed July 26, 1943
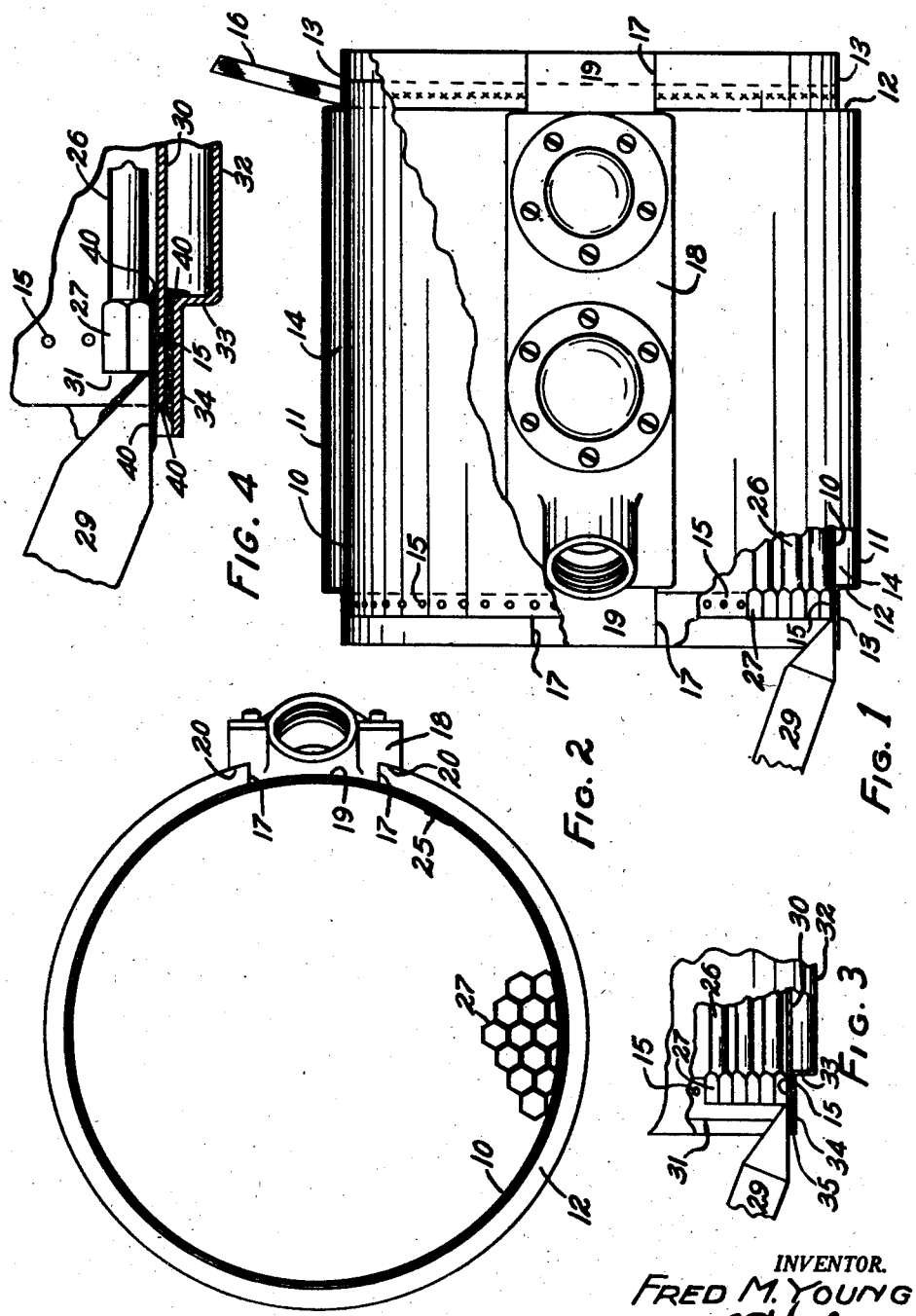
INVENTOR.
FRED M. YOUNG
BY
ATTORNEY Patented May 27, 1947

2,421,362

UNITED STATES PATENT OFFICE 2,421,362

HEAT EXCHANGER

Fred M. Young, Racine, Wis.

Application July 26, 1943, Serial No. 496,237

2 Claims. (Cl. 257—128)

The present invention relates to an oil temperature controlling device as generally used on airplanes wherein the cooling medium is preferably air forced through the tubes by frontal pressure similar to the device shown in Patent No. 2,293,960, August 25, 1942, Fred M. Young.

Objects of the present invention are to provide a design and method of manufacture which will reduce cost, simplify the device, reduce weight and provide a structure which is safe and reliable.

I accomplish the above stated objects by providing a cylinder wherein the tubes are nested in the cylinder similar to that shown in the above referred to patent; whereby a tube chamber is formed and having secured thereto a relatively narrow longitudinally positioned valve housing, and providing a fractional outer cylinder having inwardly extending flanges with outwardly extending flanges which lie on the first cylinder with its ends contacting the sides of the valve housing, the outwardly extending flanges lying over hexagonal ends of the tubes of the bundle of tubes.

An object of the present invention is to preferably electrically seam weld the outwardly extending flanges of the cylinders and to provide spaced apertures in the inner cylinder under the tube ends so when the hexagonal ends of the tubes are bonded to the cylinder, some of the bonding material will flow into the apertures and between the cylinder and the flanges thus to insure a strong, leak tight joint between the tube ends, cylinder and flanges.

To these and other useful ends, my invention consists of parts, combinations of parts, and method of construction, as hereinafter set forth and claimed and shown in the accompanying drawings in which:

Fig. 1 illustrates a top view of the preferred form of my invention, partially sectioned and showing a few of the tube ends and method of soldering the outer tubes of the bundle of tubes to the cylinder and outer closure.

Fig. 2 is an end view of the device illustrating a few of the tubes in position as shown in Figure 1.

Fig. 3 is a fractional section similar to Figure 1 but illustrating a modification.

Fig. 4 is an enlarged fractional view of Fig. 3, illustrating the position the device is held when soldering the outer tube ends to the inner cylinder and the inner to the outer cylinder and making the solder connection between these three members.

As thus illustrated, the cylinder of my device is designated by reference numeral 10. An annular chamber 14 around the cylinder is formed by means of an outer wall 11 having at its ends inwardly turned flanges 12—12 with outwardly extending flanges 13, 13 which lie on member 10 as illustrated. Member 10 terminating preferably midway members 12 and the ends of members 13.

Cylinder 10 is provided with spaced apertures 15 which are positioned directly under the hexagonal ends of the tubes. Flanges 13 on their transverse edges are preferably electrically seam welded to cylinder 10 in a manner too well known to require description except to illustrate the welding wheel 16 in position for making the weld.

Members 11, 12 and 13 terminate as at 17—17 and in contact with the sides of a valve housing 18 as illustrated, the space between the ends of member 13 being filled by members 19 the ends of which lie against the ends of member 18.

Member 18 is provided preferably with overhanging ledges 20—20 as illustrated in Figure 2. Member 18 is adapted to be fitted with valves and ports somewhat similar to the valves and port in members C and D as illustrated in the previously mentioned patent. Cylinder 10 is preferably made from flat sheet metal and shaped as shown, the edges being joined together at 25.

I provide tubes 26 which are closely spaced in a bundle which substantially fills cylinder 10, their ends being expanded and hexagonal in shape as at 27 and lying together and being bonded so as to form end closures for the tube chamber.

After the tubes have been assembled together and positioned in the cylinders, the outside edges of the outer tube ends are bonded to the cylinders by means of a soldering iron 29 held in the position shown in Figure 1; thus to seal the spaces between the ends of the tubes and cylinders and at which time more or less bonding material 40 will flow into apertures 15 and between flanges 13 and the tubes; thus to insure strong and leak proof joints.

In Figure 4 I show an enlarged fraction of Figure 1 illustrating how the bonding material 40 flows between the tube ends and member 10 and through apertures 15 and between members 10 and 13. Generally the unit is tipped at an angle so as to encourage the flow of bonding material from the iron into the joints.

In Figure 3, cylinder 30 terminates at its ends at 31. Members 32 and 33 are similar to members 11 and 12 of Figure 1. Member 34 is similar to member 13 of Figure 1, except its ends terminate at 35, a filler similar to member 19 acting to fill the space between the edges of member 34 and its ends and housing 18. The advantage of this design over that shown in Figure 1 is that the soldering iron lies on the protruding inner surface of cylinder 30 thus to facilitate the flow of solder 40 under members 27.

One of the advantages of the present design is that port connections from the valves to the annular chamber and tube chamber may be short and direct.

Having thus shown and described my invention, I claim:

1. A device of the character described comprising, a circular in cross section inner cylinder, a bundle of tubes, their ends being expanded and formed into hexagonal shapes and being nested in the inner cylinder with the hexagonal ends bonded together, the outer edges of the outer tube ends being bonded to the inner cylinder, an elongated valve housing adapted to fit longitudinally on said inner cylinder and being bonded thereto, the ends of the housing terminating a short distance from the ends of the inner cylinder, an outer closure for the major part of said inner cylinder and being offset inwardly in transverse alignment with the ends of said elongated housing, its ends lying on the inner cylinder for a short distance and overhanging the ends of the inner cylinder for a short distance and being bonded to the inner cylinder, the transverse ends of said outer closure from and between the offsets, contacting the sides of said elongated chamber and being bonded thereto to thereby form a narrow circular chamber which extends around the inner cylinder from opposite sides of the elongated housing, whereby a soldering iron may be used for bonding the outer edges of the tube ends to the inner cylinder and the inner cylinder to the outer cylinder by successively turning the device.

2. A device as recited in claim 1, spaced openings in said inner cylinder and positioned transversely between the ends of said hexagonal tube ends, whereby during said bonding operation the bonding material will flow through said openings and form an intimate bonding contact between the tube ends and the adjacent ends of said cylinders.

FRED M. YOUNG.

REFERENCES CITED

The following references are of record in the file of this patent:

UNITED STATES PATENTS

| Number | Name | Date |
|---|---|---|
| 2,288,599 | Ramsaur | July 7, 1942 |
| 2,083,440 | Fink | June 8, 1937 |
| 2,307,300 | Ramsaur | Jan. 5, 1943 |
| 2,293,960 | Young | Aug. 25, 1942 |
| 1,840,510 | Kelley | Jan. 12, 1932 |